(12) United States Patent
Luo et al.

(10) Patent No.: US 9,755,530 B2
(45) Date of Patent: Sep. 5, 2017

(54) POWER CONVERTER WITH SYNCHRONOUS CONTROL FUNCTION AND CONTROL METHOD THEREOF

(71) Applicant: RICHTEK TECHNOLOGY CORPORATION, Chupei, HsinChu (TW)

(72) Inventors: Li-Di Luo, HsinChu (TW); Yu-Kai Chen, Taipei (TW); Yu-Chang Chen, Nantou (TW)

(73) Assignee: RICHTEK TECHNOLOGY CORPORATION, Chupei, Hsinchu (TW)

( * ) Notice: Subject to any disclaimer, the term of this patent is extended or adjusted under 35 U.S.C. 154(b) by 0 days.

(21) Appl. No.: 15/144,610

(22) Filed: May 2, 2016

(65) Prior Publication Data
US 2016/0344296 A1 Nov. 24, 2016

Related U.S. Application Data

(60) Provisional application No. 62/164,697, filed on May 21, 2015.

(51) Int. Cl.
*H02M 3/315* (2006.01)
*H02M 3/335* (2006.01)
*H02M 1/08* (2006.01)

(52) U.S. Cl.
CPC ......... *H02M 3/33523* (2013.01); *H02M 1/08* (2013.01); *H02M 3/33592* (2013.01); *Y02B 70/1475* (2013.01)

(58) Field of Classification Search
CPC .. H02M 3/315; H02M 3/335; H02M 3/33507; H02M 3/33576; H02M 3/33592; H02M 3/33523; H02M 3/3155; H02M 1/4208; H02M 5/4585; H02H 7/125; H02H 7/122
(Continued)

(56) References Cited

U.S. PATENT DOCUMENTS 5,991,171 A * 11/1999 Cheng ............... H02M 3/33507
363/21.03
6,246,592 B1 * 6/2001 Balogh ............. H02M 3/33592
363/16

(Continued)

*Primary Examiner* — Adolf Berhane
(74) *Attorney, Agent, or Firm* — Tung & Associates (57) ABSTRACT

The present invention discloses a power converter with synchronous control function and control method thereof. The power converter includes: a transformer, a power switch, a switch control unit, a signal coupling circuit, a synchronous rectifying switch and a secondary side control circuit. The switch control unit generates an operation signal according to a feedback signal, and generates a first synchronous signal which is related to the operation signal. The signal coupling circuit couples the first synchronous signal to generate a second synchronous signal. The synchronous rectifying switch is turned ON/OFF according to a synchronous rectifying switch signal, for synchronous rectification. The secondary side control circuit generates the synchronous rectifying switch signal according to a secondary side level detection signal and the second synchronous signal, to control the synchronous rectifying switch. The ON time of the power switch and the ON time of the synchronous rectifying switch do not overlap.

21 Claims, 8 Drawing Sheets

(58) Field of Classification Search
USPC ...... 363/20, 21.01, 21.06, 21.14, 52, 55, 56, 363/81, 84, 89, 95, 97, 131
See application file for complete search history.

(56) References Cited

U.S. PATENT DOCUMENTS

| | | | | |
|---|---|---|---|---|
| 6,711,035 | B2* | 3/2004 | Tomioka | H02M 3/33592 323/282 |
| 6,888,728 | B2* | 5/2005 | Takagi | H02M 3/33592 363/17 |
| 6,961,253 | B1* | 11/2005 | Cohen | H02M 1/08 363/89 |
| 8,891,268 | B2* | 11/2014 | Sheng | H02M 1/36 363/49 |
| 9,030,846 | B2* | 5/2015 | Bai | H02M 3/33592 363/21.02 |
| 9,293,999 | B1* | 3/2016 | Lam | H02M 3/33546 |
| 2006/0171180 | A1* | 8/2006 | Kyono | H02M 3/33592 363/95 |
| 2012/0257421 | A1* | 10/2012 | Brkovic | H01F 27/38 363/21.07 |

\* cited by examiner

POWER CONVERTER WITH SYNCHRONOUS CONTROL FUNCTION AND CONTROL METHOD THEREOF

CROSS REFERENCE

The present invention claims priority to U.S. 62/164,697, filed on May 21, 2015.

BACKGROUND OF THE INVENTION

Field of Invention

The present invention relates to a power converter; particularly, it relates to a power converter with synchronous control function, and a control method thereof.

Description of Related Art

In a conventional isolated type AC-DC converter, usually, the secondary side of the transformer employs a diode to rectify the current. However, the voltage drop across the diode causes power loss, so it is proposed to replace the diode by a synchronous rectifying switch. In this arrangement, it must be ensured that the synchronous rectifying switch at the secondary side of the transformer is OFF when a power switch at the primary side of the transformer is ON, and the power switch at the primary side of the transformer is OFF when the synchronous rectifying switch at the secondary side of the transformer is ON.

In view of the above, the present invention proposes a power converter possessing synchronous control function and a control method thereof.

SUMMARY OF THE INVENTION

From one perspective, the present invention provides a power converter with synchronous control function, for converting an input voltage to an output voltage at an output terminal of the power converter, the power converter comprising: a first transformer; a power switch which is coupled to a primary winding of the first transformer and which is configured to be operably turned ON or OFF according to an operation signal, to control the primary winding of the first transformer, so that the input voltage coupled to the primary winding of the first transformer is converted to the output voltage coupled to a secondary winding of the first transformer; a switch control unit which is coupled to the power switch and which is configured to operably generate the operation signal according to a feedback signal which is related to the output voltage, and to operably generate a first synchronous signal which is related to the operation signal; a signal coupling circuit which is coupled to the switch control unit and which is configured to operably couple the first synchronous signal to generate a second synchronous signal corresponding to the first synchronous signal; a synchronous rectifying switch which is coupled between the secondary winding of the first transformer and the output terminal, and which is configured to be operably turned ON or OFF according to a synchronous rectifying switch signal, for synchronous rectification; and a secondary side control circuit which is coupled to the secondary winding of the first transformer and the synchronous rectifying switch, and which is configured to operably generate the synchronous rectifying switch signal according to a secondary side level detection signal and the second synchronous signal, to control the synchronous rectifying switch; wherein the synchronous rectifying switch signal determines a turned-OFF time point of the synchronous rectifying switch according to a level change along a first switching direction of the first synchronous signal, and wherein the operation signal determines a turned-ON time point of the power switch according to a level change along a second switching direction of the first synchronous signal, such that while the power switch is ON, the synchronous rectifying switch is OFF, wherein the first switching direction and the second switching direction are opposite to each other; wherein, there is a dead time between the turned-OFF time point of the synchronous rectifying switch and the turned-ON time point of the power switch, and the dead time corresponds to a pulse width of the first synchronous signal.

In one embodiment, the first synchronous signal and the second synchronous signal are pulse signals.

In one embodiment, a pulse length of the first synchronous signal and a pulse length of the second synchronous signal are 200 nanoseconds (nsec) or below.

In one embodiment, the signal coupling circuit includes a second transformer, which is coupled between the secondary winding of the first transformer and the switch control unit.

In one embodiment, the signal coupling circuit includes: a first resistor having a first end coupled to the switch control unit and a second end coupled to a ground of a primary side of the first transformer; a second resistor having a third end coupled to the secondary side control circuit and a fourth end coupled to a ground of a secondary side of the first transformer; and a first capacitor and a second capacitor, wherein the first capacitor is coupled between the first end of the first resistor and the third end of the second resistor, and the second capacitor is coupled between the second end of the first resistor and the fourth end of the second resistor. The first capacitor and/or the second capacitor is preferably a Y capacitor.

In one embodiment, the switch control unit includes: a pulse width modulation (PWM) signal generation circuit, which is configured to operably generate an initial PWM signal according to the feedback signal; a pulse generation circuit which is coupled to the PWM signal generation circuit and which is configured to operably generate a pulse signal according to the initial PWM signal, wherein the pulse signal is configured to operably generate the first synchronous signal; and a delayed turned-ON circuit which is coupled to the PWM signal generation circuit and the pulse generation circuit, and which is configured to operably generate the operation signal according to the initial PWM signal and the pulse signal; wherein a turned-ON time point of the operation signal is later than a turned-ON time point of the initial PWM signal by a delayed period, in which the delayed period corresponds to a pulse width of the pulse signal.

In one embodiment, the switch control unit further includes: a current-to-voltage conversion circuit which is coupled between the feedback signal and the PWM signal generation circuit, and which is configured to operably perform a current-to-voltage conversion on the feedback signal, and the converted feedback signal is transmitted to the PWM signal generation circuit.

In one embodiment, the secondary side control circuit includes a switch signal generation circuit which is configured to operably generate the synchronous rectifying switch signal according to the secondary side level detection signal and the second synchronous signal, wherein the secondary side level detection signal determines a turned-ON time point of the synchronous rectifying switch, while the second synchronous signal determines the turned-OFF time point of the synchronous rectifying switch.

In one embodiment, the secondary side control circuit further includes: an input voltage confirmation circuit, which is configured to operably confirm whether the input voltage is within a predetermined range, and when the input voltage is determined not within a predetermined range, the switch signal generation circuit is disabled.

In one embodiment, the secondary side control circuit further includes: a maximum on-time control circuit, which is configured to operably determine whether an ON time of the synchronous rectifying switch signal reaches an upper limit, and when the ON time of the synchronous rectifying switch signal reaches the upper limit, the synchronous rectifying switch is turned OFF to override the decision of the second synchronous signal.

In one embodiment, the secondary side control circuit further includes: a voltage-second balancing circuit, which is configured to operably generate a voltage-second signal according to the input voltage, an ON time of the operation signal, a target level of the output voltage and the synchronous rectifying switch signal; wherein the switch signal generation circuit controls the synchronous rectifying switch according to the voltage-second signal, such that a product of the input voltage multiplied by the ON time of the operation signal is equal to a product of the output voltage multiplied by the ON time of the synchronous rectifying switch signal to achieve a voltage-second balance, and when the voltage-second balance is achieved, the synchronous rectifying switch is turned OFF to override the decision of the second synchronous signal.

In one embodiment, the second synchronous signal sets a flag, and the setting of the flag enables the switch signal generation circuit; and after a delayed period from when the synchronous rectifying switch signal outputted from the switch signal generation circuit turns ON the synchronous rectifying switch, the flag is reset.

In one embodiment, the synchronous rectifying switch includes a switch and a diode, which are connected in parallel to each other, wherein an anode of the diode is coupled to the output terminal and a cathode of the diode is coupled to the secondary winding of the first transformer.

In one embodiment, the diode is a parasitic body diode of the synchronous rectifying switch or a discrete component.

In one embodiment, the secondary side control circuit is coupled to the secondary winding of the first transformer via a resistor, to retrieve the secondary side level detection signal.

From another perspective, the present invention provides a control method of a power converter, the power convertor comprising a first transformer; a power switch which is coupled to a primary winding of the first transformer and which is configured to be operably turned ON or OFF according to an operation signal, to control the primary winding of the first transformer, so that an input voltage coupled to the primary winding of the first transformer is converted to an output voltage coupled to a secondary winding of the first transformer; and a synchronous rectifying switch which is coupled between the secondary winding of the first transformer and the output terminal; the control method of the power converter comprising: generating the operation signal according to a feedback signal which is related to the output voltage, and generating a first synchronous signal which is related to the operation signal; coupling the first synchronous signal to generate a second synchronous signal corresponding to the first synchronous signal, and transmitting the generated second synchronous signal to a secondary side of the first transformer; determining a turned-ON time point of the synchronous rectifying switch according to a level of a secondary winding of the first transformer, and determining a turned-OFF time point of the synchronous rectifying switch according to a level change along a first switching direction of the first synchronous signal; determining a turned-ON time point of the power switch according to a level change along a second switching direction of the first synchronous signal, whereby while the power switch is ON, the synchronous rectifying switch is OFF, wherein the first switching direction and the second switching direction are opposite to each other; and providing a dead time between the turned-OFF time point of the synchronous rectifying switch and the turned-ON time point of the power switch, wherein the dead time corresponds to a pulse width of the first synchronous signal.

The objectives, technical details, features, and effects of the present invention will be better understood with regard to the detailed description of the embodiments below, with reference to the attached drawings.

DESCRIPTION OF THE PREFERRED EMBODIMENTS

The above and other technical details, features and effects of the present invention will be will be better understood with regard to the detailed description of the embodiments below, with reference to the drawings. The drawings as referred to throughout the description of the present invention are for illustration only, to show the interrelations between the apparatus and devices, but not drawn according to actual scale.

Figure 1:
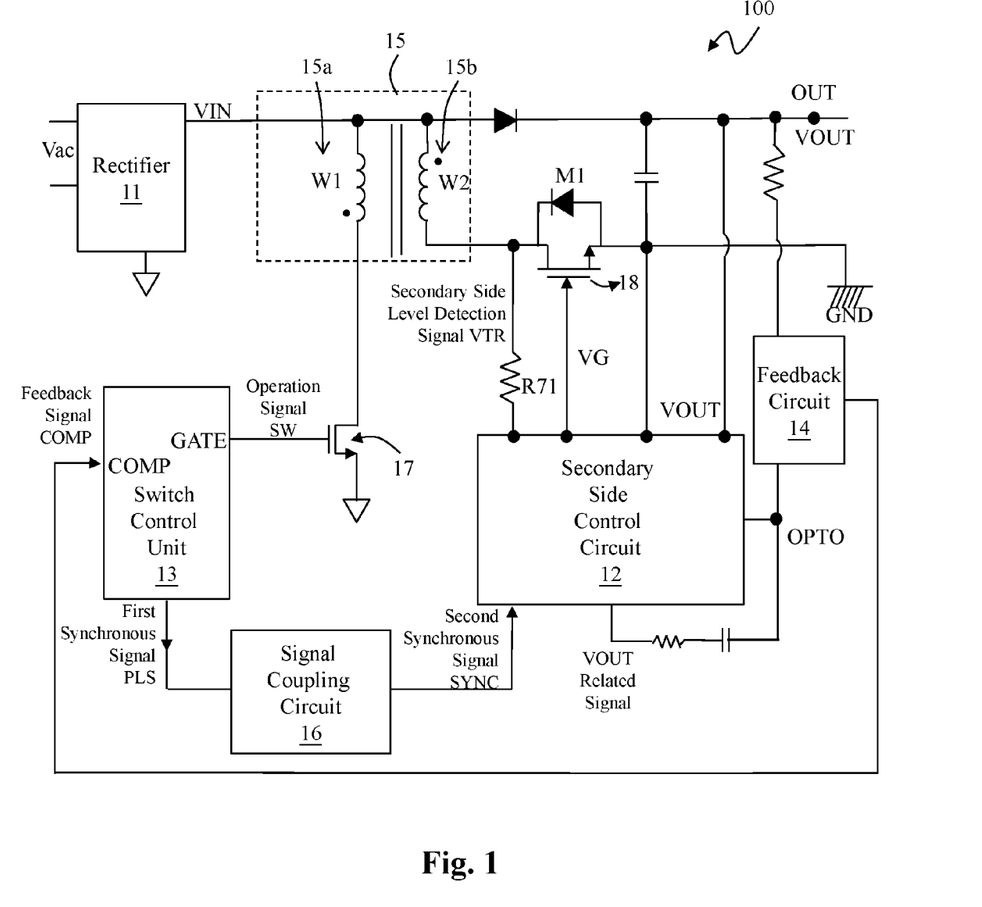
FIG. 1 shows a block diagram of a power converter with synchronous control function according to an embodiment of the present invention.
Figure 2:
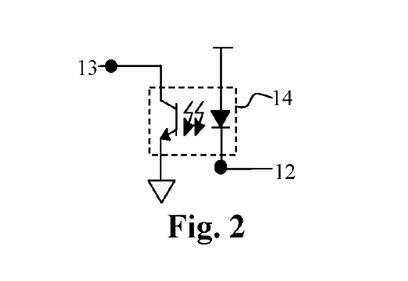
FIG. 2 shows an embodiment of a feedback circuit 14.

Please refer to FIGS. 1 and 2. FIG. 1 shows a block diagram of a power converter with synchronous control function according to an embodiment of the present invention. FIG. 2 shows an embodiment of a feedback circuit 14.

In this embodiment, the power converter 100 with synchronous control function is for example but not limited to an isolated type AC-DC converter. The power converter 100 converts an input voltage VIN to an output voltage VOUT at an output terminal OUT of the power converter 100. The power converter 100 comprises: a transformer 15, a power switch 17, a switch control unit 13, a signal coupling circuit 16, a synchronous rectifying switch 18 and a secondary side control circuit 12.

In addition, the power converter 100 can optionally comprises a feedback circuit 14 and a resistor R71 coupled between the secondary side control circuit 12 and the transformer 15. Because the isolated type AC-DC converter is well known to those skilled in the art, for the sake of simplicity in figures, only circuit details relevant to the present invention are illustrated, while the other circuit details irrelevant to the present invention are omitted.

The transformer 15 includes a primary winding W1 and a secondary winding W2. The primary winding W1 is at a primary side 15a of the transformer 15, for receiving the input voltage VIN. The secondary winding W2 is at a secondary side 15b of the transformer 15, for generating the output voltage VOUT at the output terminal OUT. In one embodiment, the input voltage VIN can be generated via an alternating current (AC) power supply Vac through a rectifier 11.

The power switch 17 is coupled to the primary winding W1 of the transformer 15 and switches ON/OFF according to an operation signal SW, to control a current flowing through the primary winding W1, so that the input voltage VIN is converted to the output voltage VOUT through inductive coupling between the primary winding W1 and the secondary winding W2.

The switch control unit 13 is coupled to the power switch 17 and is configured to operably generate the operation signal SW (which is outputted from an operation signal terminal GATE of the switch control unit 13), to control the power switch 17. In this embodiment, the switch control unit 13 generates the operation signal SW according to a feedback signal COMP and generates a first synchronous signal PLS which is related to the operation signal SW.

The signal coupling circuit 16 is coupled to the switch control unit 13 and is configured to operably couple the first synchronous signal PLS to generate a second synchronous signal SYNC corresponding to the first synchronous signal PLS.

The synchronous rectifying switch 18 is coupled between the secondary winding W2 of the transformer 15 and the output terminal OUT, and is configured to be operably turned ON or OFF according to a synchronous rectifying switch signal VG, for synchronous rectification.

In this embodiment, the power switch 17 and the synchronous rectifying switch 18 can be for example but not limited to NMOS power transistors. In another embodiment, the power switch 17 and the synchronous rectifying switch 18 can be PMOS power transistors. In the embodiments as described below, a transistor is turned ON by a high level signal and turned OFF by a low level signal, for illustrative purpose. In another embodiment, the meanings of high and low levels of a signal can be interchanged, with corresponding amendments of the circuits processing these signals.

In one embodiment, the synchronous rectifying switch 18 can include a diode M1. The anode of this diode M1 is coupled to the output terminal OUT and the cathode of such diode M1 is coupled to the secondary winding W2 of the transformer 15. The diode M1 can be a discrete component connected in parallel to the synchronous rectifying switch 18, which can be a general diode or a Zener diode, or a parasitic body diode of the synchronous rectifying switch 18.

The secondary side control circuit 12 is coupled to the secondary winding W2 of the transformer 15 and the synchronous rectifying switch 18. In this embodiment, the secondary side control circuit 12 is configured to operably generate the synchronous rectifying switch signal VG according to a secondary side level detection signal VTR and the second synchronous signal SYNC, to control the synchronous rectifying switch 18.

In one embodiment, the secondary side control circuit 12 can be coupled to the secondary winding W2 of the transformer 15 via a resistor R71, to retrieve the secondary side level detection signal VTR.

The feedback circuit 14 has one end coupled to the switch control unit 13 and another end coupled to the secondary side control circuit 12. The feedback circuit 14 generates the feedback signal COMP according to the output voltage VOUT outputted from the secondary side control circuit 12. Because the power converter 100 of this embodiment is an isolated type AC-DC converter, in one embodiment, the feedback circuit 14 can correspondingly be an isolated type feedback circuit which is for example but not limited to an opto-coupler circuit, as shown in FIG. 2.

One important difference between the present invention and the prior art is that: in the prior art, the power switch 17 and the synchronous rectifying switch 18 are synchronized by transmitting synchronization signals to the primary side, to control the switching time point of the power switch 17 at the primary side according to the switching time point of the synchronous rectifying switch 18 at the secondary side. In contrast, in the present invention, the power switch 17 and the synchronous rectifying switch 18 are synchronized by transmitting synchronization signals to the secondary side, to control the switching time point of the synchronous rectifying switch 18 at the secondary side according to the switching time point of the power switch 17 at the primary side. Another important feature of the present invention is that there is a dead time between the turned-OFF time point of the synchronous rectifying switch 18 and the turned-ON time point of the power switch 17, to ensure operation safety (the details of the above will be explained later).

Figure 3A:
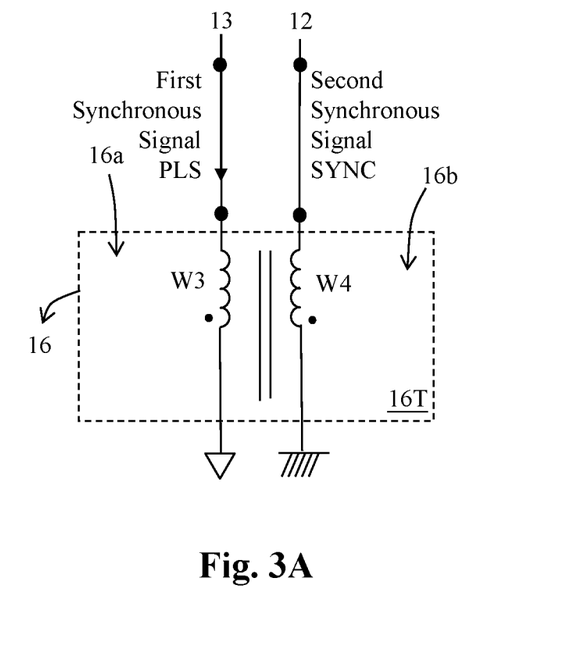
FIG. 3A shows an embodiment of a signal coupling circuit 16.
Figure 3B:
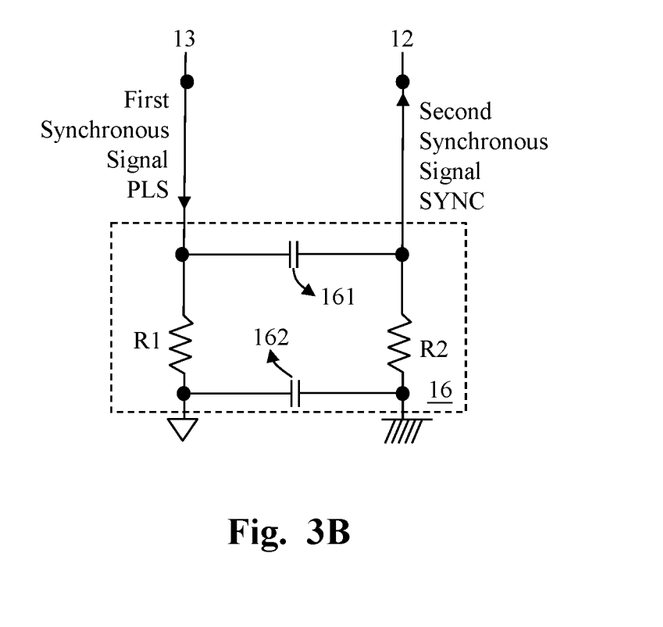
FIG. 3B shows another embodiment of a signal coupling circuit 16.

Please refer to FIG. 3A and FIG. 3B. FIG. 3A shows an embodiment of a signal coupling circuit 16. FIG. 3B shows another embodiment of a signal coupling circuit 16.

In the present invention, the signal coupling circuit 16 is configured to operably couple the first synchronous signal PLS to generate the second synchronous signal SYNC, wherein the second synchronous signal SYNC corresponds to the first synchronous signal PLS. The secondary side control circuit 12 generates the synchronous rectifying switch signal VG according to the secondary side level detection signal VTR and the second synchronous signal SYNC, to control the synchronous rectifying switch 18. The signal coupling circuit 16 couples and transmits the signal from the primary side to the secondary side. Such signal coupling can be achieved through a transformer or a capacitor. Preferably but not necessarily, the first synchronous signal PLS and the second synchronous signal SYNC are pulse signals, which can reduce the power consumed during signal transmission. The pulse length of the first synchronous signal PLS and the pulse length of the second synchronous signal SYNC are preferably 200 nanoseconds (nsec) or below.

As shown in FIG. 3A, in one embodiment, the signal coupling circuit 16 includes a transformer 16T, which is coupled between the switch control unit 13 and the secondary side control circuit 12. The transformer 16T includes a primary winding W3 and a secondary winding W4. The primary winding W3 is at a primary side 16a of the transformer 16T, for receiving the first synchronous signal PLS. The secondary winding W4 is at a secondary side 16b of the transformer 16T, for outputting the second synchronous signal SYNC generated by the transformer 16T.

As shown in FIG. 3B, in another embodiment, the signal coupling circuit 16 can include a resistor R1, a resistor R2, a capacitor 161 and a capacitor 162. The resistor R1 has one end (upper end) coupled to the switch control unit 13 and the other end (lower end) coupled to the ground of the primary side 15a of the transformer 15. The resistor R2 has one end (upper end) coupled to the secondary side control circuit 12 and the other end (lower end) coupled to the ground of the secondary side 15b of the transformer 15. The capacitor 161 is coupled between the upper end of the resistor R1 and the upper end of the resistor R2. The capacitor 162 is coupled between the lower end of the resistor R1 and the lower end of the resistor R2. The capacitor 161 and the capacitor 162 can each be a general capacitor or a high rating capacitor (e.g., a Y capacitor). The resistor R1 can be a device outside or inside of the switch control unit 13, and the resistor R2 can be a device outside or inside of the secondary side control circuit 12.

Figure 4:
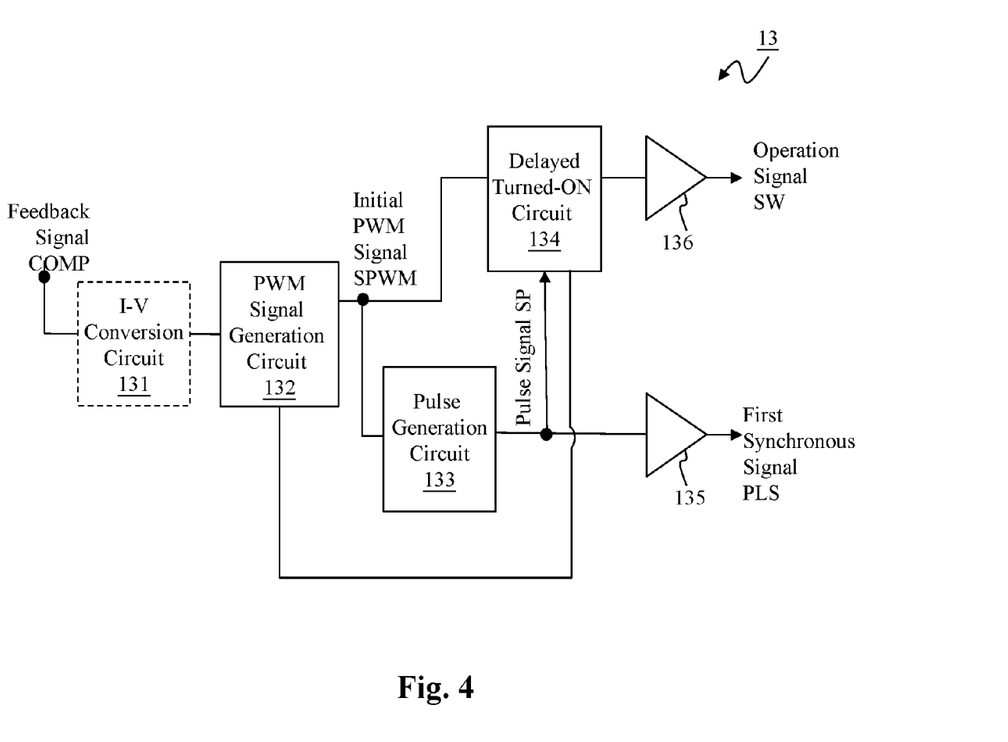
FIG. 4 shows a block diagram of a switch control unit 13 according to an embodiment of the present invention.

Please refer to FIG. 4, which shows a block diagram of a switch control unit 13 according to an embodiment of the present invention. In one embodiment, the switch control unit 13 includes: a pulse width modulation (PWM) signal generation circuit 132, a pulse generation circuit 133 and a delayed turned-ON circuit 134. The PWM signal generation circuit 132 is configured to operably generate an initial PWM signal SPWM according to the feedback signal COMP (or a signal related to the feedback signal COMP). The pulse generation circuit 133 is coupled to the PWM signal generation circuit 132 and is configured to operably generate a pulse signal SP according to the initial PWM signal SPWM. In the present invention, the pulse signal SP determines the turned-ON delay time of the first synchronous signal PLS as compared with the initial PWM signal SPWM. The delayed turned-ON circuit 134 is coupled to the PWM signal generation circuit 132 and the pulse generation circuit 133, and is configured to operably generate the operation signal SW according to the initial PWM signal SPWM and the pulse signal SP. The turned-ON time point of the operation signal SW is later than the turned-ON time point of the initial PWM signal SPWM by a delayed period which is determined by the pulse width of the pulse signal SP.

In addition, the switch control unit 13 can optionally include a current-to-voltage (I-V) conversion circuit 131. The I-V conversion circuit 131 is coupled between the feedback signal COMP and the PWM signal generation circuit 132, and is configured to operably perform a current-to-voltage conversion on the feedback signal COMP, and output the converted feedback signal COMP to the PWM signal generation circuit 132. In case that the feedback signal COMP is a voltage signal having an appropriate level, then the I-V conversion circuit 131 can be omitted. Besides, the switch control unit 13 can optionally include a driver gate 135 and a driver gate 136, to ensure that the signals outputted from the switch control unit 13 have an appropriate level. If the operation level of the internal signals of the switch control unit 13 is approximately equal to the operation level of signals outside of the switch control unit 13, then the driver gate 135 and the driver gate 136 can be omitted. That is, the meaning of the output of the delayed turned-ON circuit 134 is the meaning of the operation signal SW, so the output of the delayed turned-ON circuit 134 and the operation signal SW can be viewed as substantially the same signal. Also, the meaning of the pulse signal SP is the meaning of the first synchronous signal PLS, so the pulse signal SP and the first synchronous signal PLS can be viewed as substantially the same signal.

Figure 7:
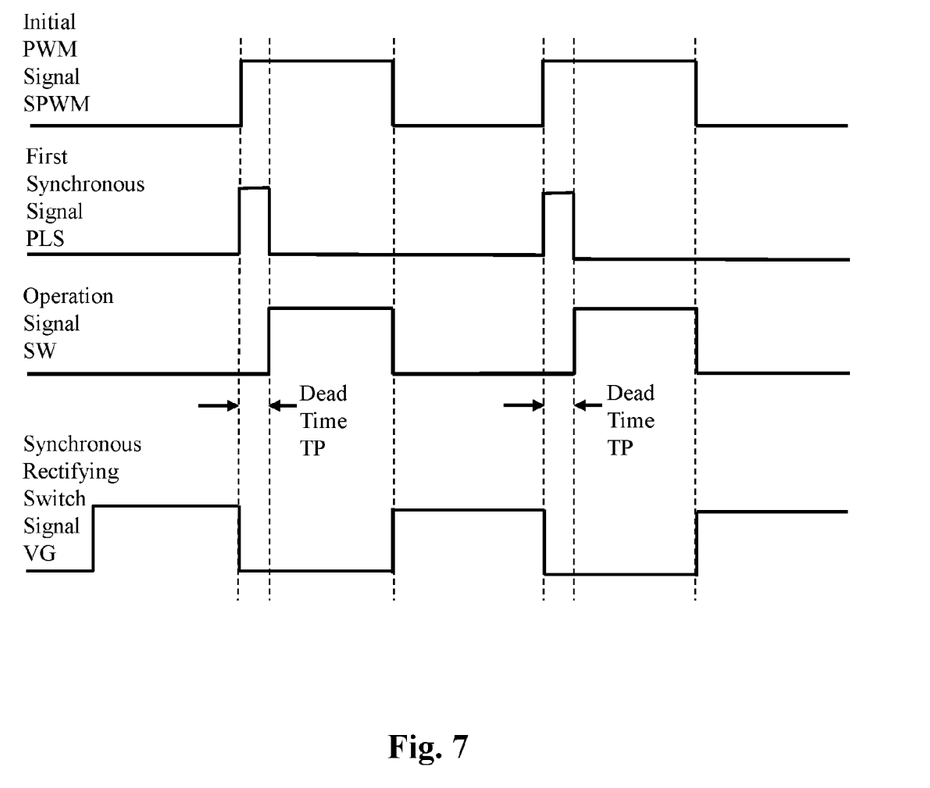
FIG. 7 shows waveforms of the initial PWM signal, the first synchronous signal, the operation signal and the synchronous rectifying switch signal.

Please refer to FIG. 7 in conjugation with FIG. 1 and FIG. 4. FIG. 7 shows waveforms of the initial PWM signal, the first synchronous signal, the operation signal and the synchronous rectifying switch signal.

In the present invention, when the power switch 17 at the primary side is ON, the present invention can ensure that the synchronous rectifying switch 18 at the secondary side is OFF. When the synchronous rectifying switch 18 at the secondary side is ON, the present invention can ensure that the power switch 17 at the primary side is OFF. Referring to FIG. 7, the present invention ensures the synchronization operation by such an approach: the synchronous rectifying switch signal VG determines a turned-OFF time point of the synchronous rectifying switch 18 according to a level change along a first switching direction of the first synchronous signal PLS (in the embodiment shown in FIG. 7, the "first switching direction level change" is a rising edge of the first synchronous signal PLS, i.e., the low-to-high level switching of the first synchronous signal PLS). (It should be explained that: because the second synchronous signal SYNC corresponds to the first synchronous signal PLS, that the synchronous rectifying switch signal VG is turned OFF "according to the second synchronous signal SYNC" is equivalent to that the synchronous rectifying switch signal VG is turned OFF "according to the first synchronous signal PLS"). On the other hand, the operation signal SW determines a turned-ON time point of the power switch 17 according to a level change along a second switching direction of the first synchronous signal PLS (or the pulse signal SP) (in the embodiment shown in FIG. 7, the "second switching direction level change" is a falling edge of the first synchronous signal PLS, i.e., the high-to-low level switching of the first synchronous signal PLS). The first switching direction and the second switching direction are opposite to each other.

As such, when the power switch 17 is turned ON according to the operation signal SW, the synchronous rectifying switch 18 has already been turned OFF according to the rising edge of the first synchronous signal PLS (or the pulse signal SP). On the other hand, when the power switch 17 is turned OFF, the secondary winding W2 starts to release energy. The secondary side control circuit 12 can detect that the secondary winding W2 is releasing energy by the secondary side level detection signal VTR, and thus the secondary side control circuit 12 knows that the power switch 17 has already been turned OFF, and it is safe to turn ON the synchronous rectifying switch 18. That is, the synchronous rectifying switch 18 is turned ON after the secondary winding W2 has already started releasing energy, and this means that the power switch 17 must have already been turned OFF.

In addition to the above-mentioned feature that the synchronous rectifying switch 18 and the power switch 17 will not be ON at the same time for synchronous rectification, as described above, there is another feature of the present invention that there is a dead time between the turned-OFF time point of the synchronous rectifying switch 18 and the turned-ON time point of the power switch 17, corresponding to a pulse width of the first synchronous signal PLS. During this dead time, the synchronous rectifying switch 18 and the power switch 17 are both OFF. The reason to provide this dead time is that: because there might be a time delay from when the first synchronous signal PLS is generated by the switch control unit 13, through the generation of the second synchronous signal SYNC by the signal coupling circuit 16, to the second synchronous signal SYNC reaching the secondary side control circuit 12, the dead time can ensure that the synchronous rectifying switch 18 has already been turned OFF while the power switch 17 is turned ON. On the other hand, as described above, when the synchronous rectifying switch 18 is turned ON, the secondary winding W2 has already been releasing energy, so the power switch 17 must have already been turned OFF. Therefore, the present invention can ensure that the synchronous rectifying switch 18 and the power switch 17 will not be ON at the same time, for operation safety.

Figure 5:
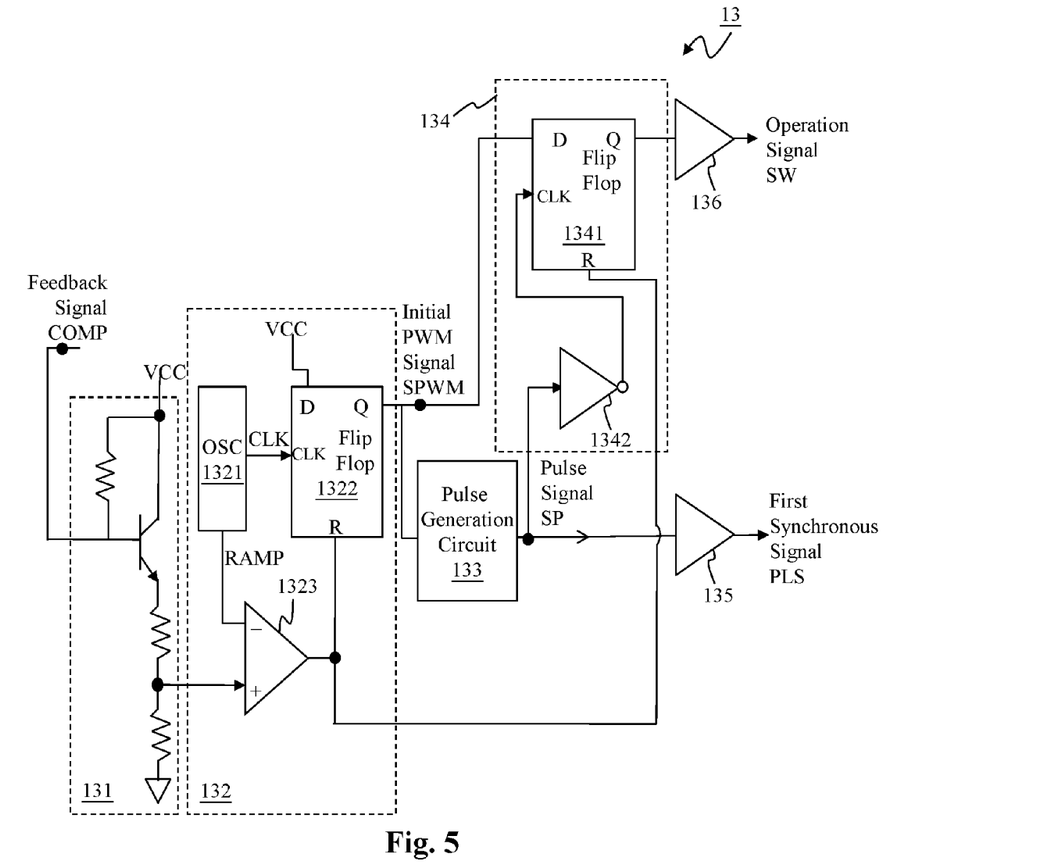
FIG. 5 shows a specific embodiment of a switch control unit 13.

Please refer to FIG. 5, which shows a specific embodiment of a switch control unit 13, in which a specific embodiment of the I-V conversion circuit 131 is shown. It should be noted that there are many ways to implement an I-V conversion circuit, and the present invention can be implemented using any one of them, not limited to the I-V conversion circuit 131 which is shown in FIG. 5 as an example. I-V conversion circuits are well-known to those skilled in the art, so the specification of the present invention does not redundantly give more examples.

FIG. 5 also shows a specific embodiment of the PWM signal generation circuit 132. The PWM signal generation circuit 132 for example includes: a comparator 1323, an oscillator 1321 and a D-type flip-flop 1322. The comparator 1323 compares the I-V converted feedback signal COMP with a ramp signal RAMP generated by the oscillator 1321, and outputs a comparison result which is sent to one input terminal of the D-type flip-flop 1322. A clock signal CLK generated by the oscillator 1321 is inputted to the clock terminal CLK of the D-type flip-flop 1322. Thus, the D-type flip-flop 1322 generates the initial PWM signal SPWM according to the clock signal CLK and the comparison result outputted from the comparator 1323. It should be noted that there are many ways to implement a PWM signal generation circuit, and the present invention can be implemented using anyone of them, not limited to the PWM signal generation circuit 132 which is shown in FIG. 5 as an example. For example, the D-type flip-flop can be replaced by an SR-type flip-flop. Because a PWM signal generation circuit is well known to those skilled in the art, the specification of the present invention does not redundantly give more examples.

Figure 6:
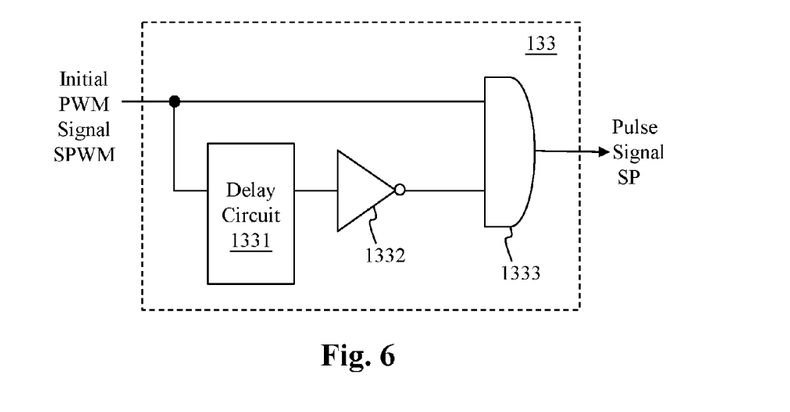
FIG. 6 shows a specific embodiment of a pulse generation circuit 133.

Please refer to FIG. 6, which shows a specific embodiment of a pulse generation circuit 133. The pulse generation circuit 133 for example includes: a delay circuit 1331, a NOT gate 1332 and an AND gate 1333. On one hand, the initial PWM signal SPWM is directly inputted to the AND gate 1333. On the other hand, the initial PWM signal SPWM is delayed by the delay circuit 1331 and then the output from the delay circuit 1331 is inputted to the NOT gate 1332. Thus, when the initial PWM signal SPWM switches from a low level to a high level, the AND gate 1333 will generate a pulse signal SP according to the initial PWM signal SPWM and the output from the NOT gate 1332, wherein the pulse signal SP is a short pulse having a short period of high-level. It should be noted that there are many ways to implement a pulse generation circuit, and the present invention can be implemented using any one of them, not limited to the pulse generation circuit 133 which is shown in FIG. 6 as an example. Because a pulse generation circuit is well known to those skilled in the art, the specification of the present invention does not redundantly give more examples.

Please still refer to FIG. 5, which also shows a specific embodiment of the delayed turned-ON circuit 134. The delayed turned-ON circuit 134 for example includes: a D-type flip flop 1341 and a NOT gate 1342. The pulse signal SP is inputted to the NOT gate 1342, and the output from the NOT gate 1342 is inputted to the clock terminal CLK of the D-type flip flop 1341. The initial PWM signal SPWM is inputted to the data input terminal of the D-type flip flop 1341. Thus, the D-type flip flop 1341 will generate an output according to the initial PWM signal SPWM and the output from the NOT gate 1342. The output from the D-type flip flop 1341 generates the operation signal SW through the driver gate 136.

More specifically, when the initial PWM signal SPWM switches from a low level to a high level, the D-type flip flop 1341 will not output a high level signal immediately. Instead, the D-type flip flop 1341 will output a high level signal at the time when the clock terminal receives a high level signal, so the turned-ON time point is delayed. As a result, according to the present invention, the turned-ON time point of the operation signal SW is later than the turned-ON time point of the initial PWM signal SPWM by a delayed period.

It should be noted that there are many ways to implement the delay circuit, and the present invention can be implemented using any one of them, not limited to the delayed turned-ON circuit 134 which is shown in FIG. 5 as an example. For example, the D-type flip-flop can be replaced by a SR-type flip-flop. Those skilled in the art can modify the circuit under the teaching by the present invention.

Thus, as described in the above, in this embodiment, the switch control unit 13 generates the operation signal SW according to the feedback signal COMP, and generates the first synchronous signal PLS which is related to the operation signal SW.

Figure 8:
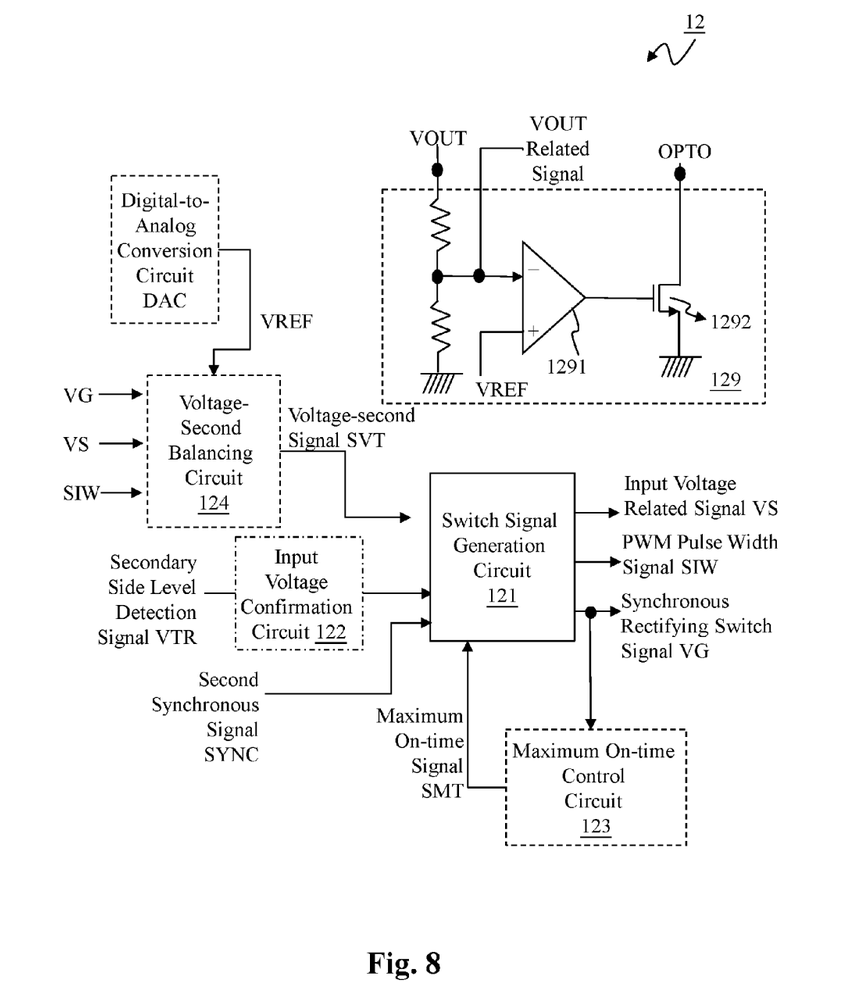
FIG. 8 shows a block diagram of a secondary side control circuit 12 according to an embodiment of the present invention.
Figure 9A:
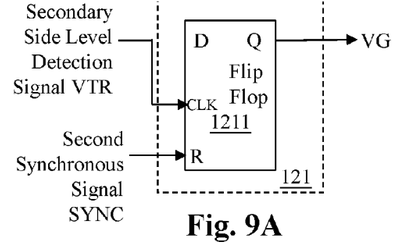
FIG. 9A shows an embodiment of a switch signal generation circuit 121.
Figure 9B:
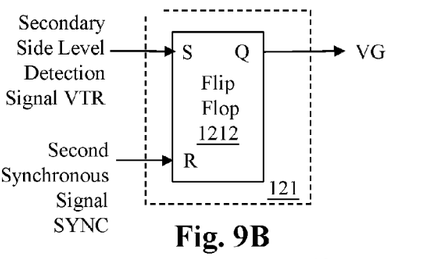
FIG. 9B shows another embodiment of a switch signal generation circuit 121.

FIG. 8 shows a block diagram of a secondary side control circuit 12 according to an embodiment of the present invention. In this embodiment, the secondary side control circuit 12 comprises a switch signal generation circuit 121. The switch signal generation circuit 121 is configured to operably generate the synchronous rectifying switch signal VG according to the secondary side level detection signal VTR and the second synchronous signal SYNC, to control the synchronous rectifying switch 18. In one embodiment, the secondary side level detection signal VTR determines the turned-ON time point of the synchronous rectifying switch 18, while the second synchronous signal SYNC determines the turned-OFF time point of the synchronous rectifying switch 18. In one embodiment, the switch signal generation circuit 121 for example can be a D-type flip-flop 1211 as shown in FIG. 9A. The data input terminal of the D-type flip-flop 1211 can be connected to any appropriate level. In another embodiment, the switch signal generation circuit 121 for example can be an SR-type flip-flop 1212 as shown in FIG. 9B.

Figure 10:
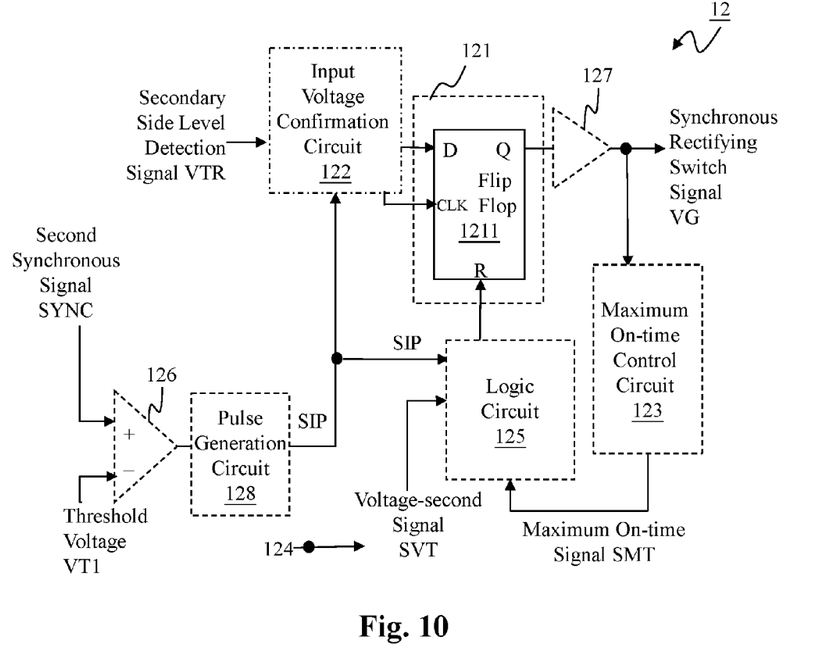
FIG. 10 shows a specific embodiment of a secondary side control circuit 12.

FIG. 10 shows a specific embodiment of a secondary side control circuit 12. The secondary side control circuit 12 can optionally comprise: an input voltage confirmation circuit 122, a maximum on-time control circuit 123 and/or a voltage-second balancing circuit 124. Note that the secondary side control circuit 12 does not necessarily include all of the above-mentioned three circuits; the secondary side control circuit 12 can comprise one, or two, or all of the above-mentioned three circuits.

Figure 13:
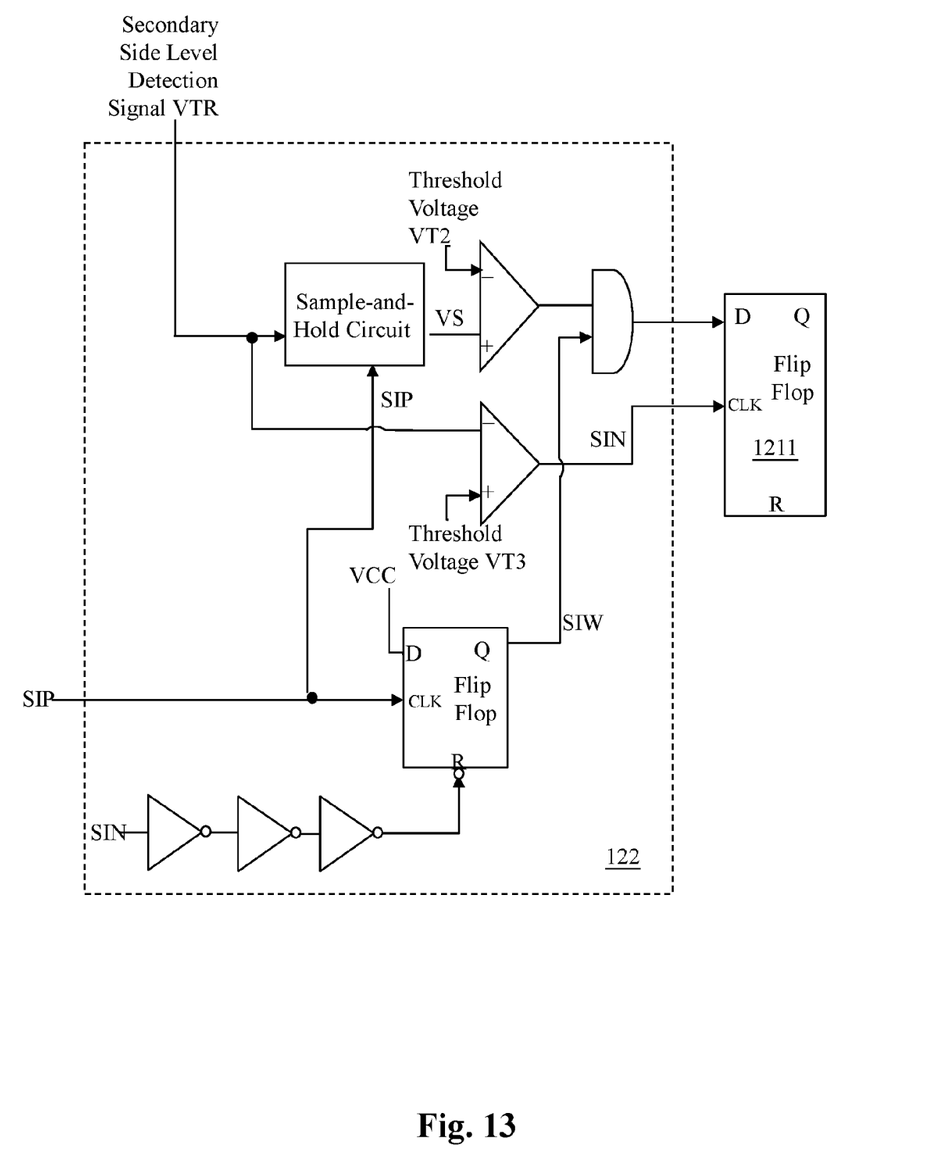
FIG. 13 shows an embodiment of an input voltage confirmation circuit 122.

The input voltage confirmation circuit 122 is configured to operably confirm whether the input voltage VIN is within a predetermined range. If the input voltage VIN is not within the predetermined range, the input voltage confirmation circuit 122 will accordingly disable the switch signal generation circuit 121 (which disables the synchronous rectifying switch 18). In one embodiment, the input voltage confirmation circuit 122 can determine whether the input voltage VIN is within the predetermined range according to the secondary side level detection signal VTR (e.g., referring to FIG. 13 which will be described later, the predetermined range corresponds to a range between a threshold voltage VT3 and a threshold voltage VT2, wherein VT3 is higher than VT2). Because the secondary side level detection signal VTR is related to a voltage across the secondary winding W2, while the voltage across the secondary winding W2 is related to the input voltage VIN, the secondary side level detection signal VTR is indicative of the level of the input voltage VIN. FIG. 13 illustrates one specific embodiment of the input voltage confirmation circuit 122. However, it should be noted that the input voltage confirmation circuit 122 shown in FIG. 13 is only one among many possible implementations. Those skilled in the art can modify the circuit to achieve other equivalent implementations under the teaching by the present invention.

Figure 12:
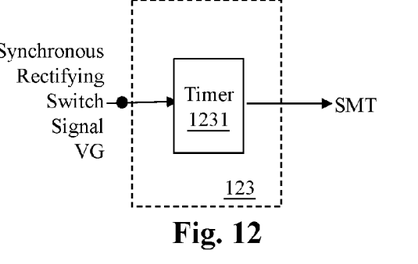
FIG. 12 shows an embodiment of a maximum on-time control circuit 123.

In one embodiment, the synchronous rectifying switch signal VG is inputted to the maximum on-time control circuit 123. The maximum on-time control circuit 123 is configured to operably determine whether the ON time of the synchronous rectifying switch signal VG reaches an upper limit. If it is determined yes, the maximum on-time control circuit 123 will output a maximum on-time signal SMT to turn OFF the synchronous rectifying switch signal VG, overriding the decision by the second synchronous signal SYNC. FIG. 12 shows a specific embodiment of the maximum on-time control circuit 123, which comprises a timer 1231. It should be noted that there are many ways to implement the maximum on-time control circuit, and the present invention can be implemented using anyone of them, not limited to the maximum on-time control circuit 123 which is shown in FIG. 12 as an example. Those skilled in the art can implement the circuit by other equivalent ways under the teaching by the present invention.

Please refer back to FIG. 8 and also refer to FIG. 13. FIG. 13 shows an embodiment of an input voltage confirmation circuit 122. In one embodiment, the voltage-second balancing circuit 124 is configured to operably generate a voltage-second signal SVT according to a signal related to the input voltage VIN (which is for example but not limited to VS as shown in FIG. 13), a signal related to the ON time of the operation signal SW (which is for example but not limited to a PWM pulse width signal SIW as shown in FIG. 13), a signal related to a target level of the output voltage (which is for example but not limited to VREF as shown in FIG. 8) and the synchronous rectifying switch signal VG. The switch signal generation circuit 121 controls the synchronous rectifying switch 18 according to the voltage-second signal SVT, such that a product of the input voltage VIN multiplied by the ON time of the operation signal SW is equal to a product of the output voltage VOUT multiplied by the ON time of the synchronous rectifying switch signal VG (thus achieving voltage-second balance). According to the present invention, as the voltage-second balance is reached, the voltage-second signal SVT generated by the voltage-second balancing circuit 124 will turn OFF the synchronous rectifying switch 18, to override the decision by the second synchronous signal SYNC.

In one embodiment, the secondary side control circuit 12 can optionally include a shunt regulator 129. FIG. 8 shows a specific embodiment of the shunt regulator 129. It should be noted that there are many ways to implement the shunt regulator, and the present invention can be implemented using any one of them, not limited to the shunt regulator 129 which is shown in FIG. 8 as an example. Other implementations will be apparent to those skilled in the art. Because a shunt regulator is well known to those skilled in the art, the specification of the present invention does not redundantly give more examples.

Please refer to FIG. 10. In one embodiment, the secondary side control circuit 12 can optionally include a comparator 126, a drive gate 127, a pulse generation circuit 128 and a logic circuit 125.

Figure 11:
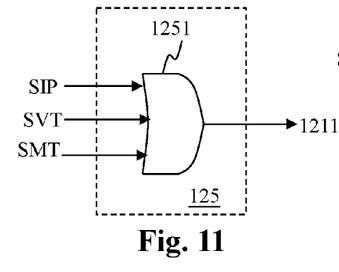
FIG. 11 shows an embodiment of a logic circuit 125.

More specifically, the comparator 126 compares the second synchronous signal SYNC with a threshold voltage VT1 to generate an output, which is inputted to the pulse generation circuit 128. The pulse generation circuit 128 generates a signal SIP. On one hand, the signal SIP can be inputted to the input voltage confirmation circuit 122 (the purpose thereof will be described later). On the other hand, the signal SIP can be inputted to the logic circuit 125. FIG. 11 shows a specific embodiment of the logic circuit 125. The logic circuit 125 for example includes an OR gate 1251. The signal SIP corresponds to the second synchronous signal SYNC, and therefore corresponds to the first synchronous signal PLS. The signal SIP provides a function that, at the turned-ON time point of the initial PWM signal SPWM, the signal SIP switches the output from the D-type flip-flop 1211 from a high level to a low level, thereby turning OFF the synchronous rectifying switch 18 (referring to FIG. 7).

In one embodiment, the logic circuit 125 receives one or more of the following inputs: the signal SIP, the maximum on-time signal SMT and/or the voltage-second signal SVT. Thus:

(1) If the maximum on-time control circuit 123 determines that an ON time of the synchronous rectifying switch signal VG has reached an upper limit, the maximum on-time control circuit 123 will output the maximum on-time signal SMT to turn OFF the synchronous rectifying switch signal VG, overriding the decision of the second synchronous signal SYNC (i.e., overriding the signal SIP).

(2) If it is determined that the voltage-second balance has been reached, the voltage-second signal SVT generated by the voltage-second balancing circuit 124 will turn OFF the synchronous rectifying switch signal VG, overriding the decision of the second synchronous signal SYNC (i.e., overriding the signal SIP).

Please refer to FIG. 13. In one embodiment, the present invention not only can enable/disable the switch signal generation circuit 121 according to whether the input voltage VIN is within a predetermined range, but also can determine whether to enable the switch signal generation circuit 121 according to a pulse of a previous second synchronous signal SYNC. More specifically, as described above, the signal SIP corresponds to the second synchronous signal SYNC and is inputted to the input voltage confirmation circuit 122. The signal SIP generates a signal SIW, which is inputted to the AND gate in FIG. 13. This action can regarded as thus: the second synchronous signal SYNC sets a flag, and the setting of the flag enables the switch signal generation circuit 121. When the synchronous rectifying switch signal VG generated by the switch signal generation circuit 121 is at a high level (which indicates that the clock terminal CLK of the D-type flip-flop 1211 is at a high level), the signal SIN is at a high level. After a delayed period, the signal SIN resets the lower flip-flop, thereby resetting the flag. This operation better ensures the operation safety of the circuit.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, a device which does not substantially influence the primary function of a signal can be inserted between any two devices in the shown embodiments, such as a switch or a resistor. For another example, it is not necessary for a high level of a signal to be ON and a low level of the signal to be OFF. The meanings of the high and low levels of a signal are interchangeable, with corresponding amendments of the circuits processing these signals. For yet another example, a D-type flip-flop and an SR-type flip-flop are interchangeable. For still another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power converter with synchronous control function, for converting an input voltage to an output voltage at an output terminal of the power converter, the power converter comprising:
   a first transformer;
   a power switch which is coupled to a primary winding of the first transformer and which is configured to be operably turned ON or OFF according to an operation signal, to control the primary winding of the first transformer, so that the input voltage coupled to the primary winding of the first transformer is converted to the output voltage coupled to a secondary winding of the first transformer;
   a switch control unit which is coupled to the power switch and which is configured to operably generate the operation signal according to a feedback signal which is related to the output voltage, and to operably generate a first synchronous signal which is related to the operation signal;
   a signal coupling circuit which is coupled to the switch control unit and which is configured to operably couple the first synchronous signal to generate a second synchronous signal corresponding to the first synchronous signal;
   a synchronous rectifying switch which is coupled between the secondary winding of the first transformer and the output terminal, and which is configured to be operably turned ON or OFF according to a synchronous rectifying switch signal, for synchronous rectification; and
   a secondary side control circuit which is coupled to the secondary winding of the first transformer and the synchronous rectifying switch, and which is configured to operably generate the synchronous rectifying switch signal according to a secondary side level detection signal and the second synchronous signal, to control the synchronous rectifying switch;
   wherein the synchronous rectifying switch signal determines a turned-OFF time point of the synchronous rectifying switch according to a level change along a first switching direction of the first synchronous signal, and wherein the operation signal determines a turned-ON time point of the power switch according to a level change along a second switching direction of the first synchronous signal, such that while the power switch is ON, the synchronous rectifying switch is OFF, wherein the first switching direction and the second switching direction are opposite to each other;
   wherein, there is a dead time between the turned-OFF time point of the synchronous rectifying switch and the turned-ON time point of the power switch, and the dead time corresponds to a pulse width of the first synchronous signal.

2. The power converter with synchronous control function of claim 1, wherein the first synchronous signal and the second synchronous signal are pulse signals.

3. The power converter with synchronous control function of claim 2, wherein a pulse length of the first synchronous signal and a pulse length of the second synchronous signal are 200 nanoseconds (nsec) or below.

4. The power converter with synchronous control function of claim 1, wherein the signal coupling circuit includes a second transformer, which is coupled between the secondary winding of the first transformer and the switch control unit.

5. The power converter with synchronous control function of claim 1, wherein the signal coupling circuit includes:
   a first resistor having a first end coupled to the switch control unit and a second end coupled to a ground of a primary side of the first transformer;
   a second resistor having a third end coupled to the secondary side control circuit and a fourth end coupled to a ground of a secondary side of the first transformer; and
   a first capacitor and a second capacitor, wherein the first capacitor is coupled between the first end of the first resistor and the third end of the second resistor, and the second capacitor is coupled between the second end of the first resistor and the fourth end of the second resistor.

6. The power converter with synchronous control function of claim 5, wherein the first capacitor and/or the second capacitor is a Y capacitor.

7. The power converter with synchronous control function of claim 1, wherein the switch control unit includes:
   a pulse width modulation (PWM) signal generation circuit, which is configured to operably generate an initial PWM signal according to the feedback signal;
   a pulse generation circuit which is coupled to the PWM signal generation circuit and which is configured to operably generate a pulse signal according to the initial PWM signal, wherein the pulse signal is configured to operably generate the first synchronous signal; and a delayed turned-ON circuit which is coupled to the PWM signal generation circuit and the pulse generation circuit, and which is configured to operably generate the operation signal according to the initial PWM signal and the pulse signal;

wherein a turned-ON time point of the operation signal is later than a turned-ON time point of the initial PWM signal by a delayed period, in which the delayed period corresponds to a pulse width of the pulse signal.

8. The power converter with synchronous control function of claim 7, wherein the switch control unit further includes:
a current-to-voltage conversion circuit which is coupled between the feedback signal and the PWM signal generation circuit, and which is configured to operably perform a current-to-voltage conversion on the feedback signal, and the converted feedback signal is transmitted to the PWM signal generation circuit.

9. The power converter with synchronous control function of claim 1, wherein the secondary side control circuit includes:
a switch signal generation circuit which is configured to operably generate the synchronous rectifying switch signal according to the secondary side level detection signal and the second synchronous signal;
wherein the secondary side level detection signal determines a turned-ON time point of the synchronous rectifying switch, while the second synchronous signal determines the turned-OFF time point of the synchronous rectifying switch.

10. The power converter with synchronous control function of claim 9, wherein the secondary side control circuit further includes:
an input voltage confirmation circuit, which is configured to operably confirm whether the input voltage is within a predetermined range, and when the input voltage is determined not within a predetermined range, the switch signal generation circuit is disabled.

11. The power converter with synchronous control function of claim 9, wherein the secondary side control circuit further includes:
a maximum on-time control circuit, which is configured to operably determine whether an ON time of the synchronous rectifying switch signal reaches an upper limit, and when the ON time of the synchronous rectifying switch signal reaches the upper limit, the synchronous rectifying switch is turned OFF to override the decision of the second synchronous signal.

12. The power converter with synchronous control function of claim 9, wherein the secondary side control circuit further includes:
a voltage-second balancing circuit, which is configured to operably generate a voltage-second signal according to the input voltage, an ON time of the operation signal, a target level of the output voltage and the synchronous rectifying switch signal;
wherein the switch signal generation circuit controls the synchronous rectifying switch according to the voltage-second signal, such that a product of the input voltage multiplied by the ON time of the operation signal is equal to a product of the output voltage multiplied by the ON time of the synchronous rectifying switch signal to achieve a voltage-second balance, and when the voltage-second balance is achieved, the synchronous rectifying switch is turned OFF to override the decision of the second synchronous signal.

13. The power converter with synchronous control function of claim 9, wherein the second synchronous signal sets a flag, and the setting of the flag enables the switch signal generation circuit; and wherein after a delayed period from when the synchronous rectifying switch signal outputted from the switch signal generation circuit turns ON the synchronous rectifying switch, the flag is reset.

14. The power converter with synchronous control function of claim 1, wherein the synchronous rectifying switch includes a switch and a diode, which are connected in parallel to each other, wherein an anode of the diode is coupled to the output terminal and a cathode of the diode is coupled to the secondary winding of the first transformer.

15. The power converter with synchronous control function of claim 14, wherein the diode is a parasitic body diode of the synchronous rectifying switch, or a discrete component.

16. The power converter with synchronous control function of claim 1, wherein the secondary side control circuit is coupled to the secondary winding of the first transformer via a resistor, to retrieve the secondary side level detection signal.

17. A control method of a power converter, the power convertor comprising a first transformer; a power switch which is coupled to a primary winding of the first transformer and which is configured to be operably turned ON or OFF according to an operation signal, to control the primary winding of the first transformer, so that an input voltage coupled to the primary winding of the first transformer is converted to an output voltage coupled to a secondary winding of the first transformer; and a synchronous rectifying switch which is coupled between the secondary winding of the first transformer and the output terminal; the control method of the power converter comprising:
generating the operation signal according to a feedback signal which is related to the output voltage, and generating a first synchronous signal which is related to the operation signal;
coupling the first synchronous signal to generate a second synchronous signal corresponding to the first synchronous signal, and transmitting the generated second synchronous signal to a secondary side of the first transformer;
determining a turned-ON time point of the synchronous rectifying switch according to a level of a secondary winding of the first transformer, and determining a turned-OFF time point of the synchronous rectifying switch according to a level change along a first switching direction of the first synchronous signal;
determining a turned-ON time point of the power switch according to a level change along a second switching direction of the first synchronous signal, whereby while the power switch is ON, the synchronous rectifying switch is OFF, wherein the first switching direction and the second switching direction are opposite to each other; and
providing a dead time between the turned-OFF time point of the synchronous rectifying switch and the turned-ON time point of the power switch, wherein the dead time corresponds to a pulse width of the first synchronous signal.

18. The control method of the power converter of claim 17, wherein the step of providing a dead time between the turned-OFF time point of the synchronous rectifying switch and the turned-ON time point of the power switch includes:
generating an initial PWM signal according to the feedback signal;

generating a pulse signal according to the initial PWM signal, wherein the pulse signal is for generating the first synchronous signal; and generating the operation signal according to the initial PWM signal and the pulse signal;

wherein a turned-ON time point of the operation signal is later than a turned-ON time point of the initial PWM signal by a delayed period which corresponds to a pulse width of the pulse signal.

19. The control method of the power converter of claim 17, further comprising:

confirming whether the input voltage is within a predetermined range, and when the input voltage is determined not within a predetermined range, disabling the synchronous rectifying switch.

20. The control method of the power converter of claim 17, further comprising:

determining whether an ON time of the synchronous rectifying switch signal reaches an upper limit, and when the ON time of the synchronous rectifying switch signal reaches the upper limit, turning OFF the synchronous rectifying switch to override the turned-OFF time point of the synchronous rectifying switch which is decided according to the level change along the first switching direction of the first synchronous signal.

21. The control method of the power converter of claim 17, further comprising:

generating a voltage-second signal according to the input voltage, an ON time of the operation signal, a target level of the output voltage and a synchronous rectifying switch signal for controlling the synchronous rectifying switch; and controlling the synchronous rectifying switch according to the voltage-second signal, such that a product of the input voltage multiplied by the ON time of the operation signal is equal to a product of the output voltage multiplied by the ON time of the synchronous rectifying switch signal to achieve a voltage-second balance, and when the voltage-second balance is achieved, turning OFF the synchronous rectifying switch to override the turned-OFF time point of the synchronous rectifying switch which is decided according to the level change along the first switching direction of the first synchronous signal.

* * * * *